United States Patent
Rieser et al.

(10) Patent No.: US 11,059,232 B2
(45) Date of Patent: Jul. 13, 2021

(54) PORTABLE TABLE TOP WELDER

(71) Applicant: Leister Technologies AG, Kaegiswil (CH)

(72) Inventors: Benedikt Rieser, Lungern (CH); Adolf Niederberger, Kaegiswil (CH); Falko Strahl, Emmenbruecke (CH)

(73) Assignee: Leister Technologies AG, Kaegiswil (CH)

( * ) Notice: Subject to any disclaimer, the term of this patent is extended or adjusted under 35 U.S.C. 154(b) by 124 days.

(21) Appl. No.: 15/657,186

(22) Filed: Jul. 23, 2017

(65) Prior Publication Data
US 2018/0036957 A1    Feb. 8, 2018

(30) Foreign Application Priority Data

Aug. 5, 2016   (DE) .................... DE202016104323.9

(51) Int. Cl.
*B29C 65/10*   (2006.01)
*B29C 65/00*   (2006.01)
(Continued)

(52) U.S. Cl.
CPC ............ *B29C 65/10* (2013.01); *B29C 65/103* (2013.01); *B29C 65/7832* (2013.01); *B29C 65/7894* (2013.01); *B29C 66/112* (2013.01); *B29C 66/1122* (2013.01); *B29C 66/135* (2013.01); *B29C 66/43* (2013.01); *B29C 66/73921* (2013.01); *B29C 66/8167* (2013.01);
(Continued)

(58) Field of Classification Search
CPC .......................... B29C 65/10; B29C 66/83413
See application file for complete search history.

(56) References Cited

U.S. PATENT DOCUMENTS

| | | | | |
|---|---|---|---|---|
| 3,879,256 A | * | 4/1975 | Rust, Jr. ................ | B29C 65/086 |
| | | | | 156/580.1 |
| 4,923,558 A | * | 5/1990 | Ellenberger ........ | B29C 66/1122 |
| | | | | 100/171 |

(Continued)

FOREIGN PATENT DOCUMENTS

| | | |
|---|---|---|
| DE | 732156 | 2/1943 |
| DE | 8805783 U1 | 6/1988 |
| KR | 100853846 B1 | 8/2008 |

OTHER PUBLICATIONS

Pfaff 8320 brochure, published Aug. 4, 2014 (Year: 2014).*

*Primary Examiner* — Philip C Tucker
*Assistant Examiner* — John Blades
(74) *Attorney, Agent, or Firm* — Von Rohrscheidt Patents

(57) ABSTRACT

A portable table top welder for welding plastic material webs, the portable table top welder including a frame including a carrier housing and a support arm at which a welding device is arranged; at least one transport roller including a rotatable transport roller axle and at least one contact pressure roller that is rotatably supported at the carrier housing, wherein a weight is arranged at an eccentrical element which is rotatably connected at one side by a concentrically supported eccentrical element axle at the carrier housing and rotatably connected at another side by an eccentrically supported contact pressure roller axle at the contact pressure roller. The table top welder handles and transports easily and can be mounted on a table or on another carrier structure in a disengageable manner.

8 Claims, 4 Drawing Sheets

(51) Int. Cl.
  *B29C 65/78* (2006.01)
  *B29C 65/20* (2006.01)
  *B29K 101/12* (2006.01)

(52) U.S. Cl.
  CPC ...... *B29C 66/81417* (2013.01); *B29C 66/828* (2013.01); *B29C 66/8248* (2013.01); *B29C 66/82265* (2013.01); *B29C 66/83413* (2013.01); *B29C 66/83415* (2013.01); *B29C 66/845* (2013.01); *B29C 66/861* (2013.01); *B29C 66/87443* (2013.01); *B29C 66/90* (2013.01); *B29C 66/9241* (2013.01); *B29C 65/2061* (2013.01); *B29C 66/431* (2013.01); *B29C 66/8221* (2013.01); *B29C 66/8242* (2013.01); *B29C 66/8324* (2013.01); *B29C 66/9141* (2013.01); *B29C 66/9161* (2013.01); *B29C 66/93451* (2013.01); *B29K 2101/12* (2013.01)

(56) References Cited

U.S. PATENT DOCUMENTS

| | | | | |
|---|---|---|---|---|
| 5,865,945 A | | 2/1999 | Sinclair | |
| 6,129,809 A | * | 10/2000 | Ellenberger | B29C 65/10 156/351 |
| 6,789,592 B2 | * | 9/2004 | Biro | B29C 65/10 156/391 |
| 8,272,420 B2 | * | 9/2012 | Henry | B32B 37/02 156/497 |
| 2008/0308234 A1 | * | 12/2008 | Seo | B23K 37/04 156/499 |

\* cited by examiner

PORTABLE TABLE TOP WELDER

RELATED APPLICATIONS

This application claims priority from and incorporates by reference German Patent Application DE 20 2016 104 323.9 filed on Aug. 5, 2016.

FIELD OF THE INVENTION

The invention relates to a portable table top welder for welding plastic material webs.

BACKGROUND OF THE INVENTION

A comparable but non portable table top welder is known from DE 732 156. In this table top welder an upper contact pressure roller is liftable and lowerable and a lower transport roller is fixed and provided with a drive. The device is configured and produced similar to a sewing machine. Heating the materials to be welded together is performed by a heated wedge.

A plastic welder that is known from U.S. Pat. No. 5,865, 942 A for welding edge seams at plastic material foils includes an electrically heated heating wedge and an S-shaped material support which is attached at a base plate wherein the S-shaped material support runs the plastic webs that are arranged about the heating wedge between two opposite contact pressure rollers that respectively include a drive. Furthermore the plastic welder includes a horn shaped jacket of the heating wedge which runs the plastic foils above and below the heating wedge. Applying the plastic welder to many variations of the for example overlap seams and hem seams is also well known. These known machines are essentially mobile automatic welders which can be optionally operated at a fixed location.

BRIEF SUMMARY OF THE INVENTION

Thus, it is an object of the invention to propose a portable welder which is improved over the prior art with respect to handling, performance and variable operations.

The object is achieved by a portable table top welder for welding plastic material webs, the portable table top welder including a frame including a carrier housing and a support arm at which a welding device is arranged; at least one transport roller including a rotatable transport roller axle and at least one contact pressure roller that is rotatably supported at the carrier housing, wherein a weight is arranged at an eccentrical element which is rotatably connected at one side by a concentrically supported eccentrical element axle at the carrier housing and rotatably connected at another side by an eccentrically supported contact pressure roller axle at the contact pressure roller. The table top welder handles and transports easily and can be mounted on a table or on another carrier structure in a disengageable manner. Due to the eccentrically supported contact pressure roller the contact pressure force of the contact pressure roller can be regulated and the transport of the plastic material webs can be provided solely by the drive of the transport roller. Additional advantageous embodiments can be derived from the dependent claims.

Accordingly the apparatus includes a frame with a carrier housing and a carrier arm at which a welding device is arranged and at least one transport roller with a rotatable transport roller axle. Furthermore a contact pressure roller is eccentrically supported by an eccentrical element at a carrier housing and a weight for controlling a contact pressure of the contact pressure roller is arranged at the carrier housing. The eccentrical element is rotatably connected on the one hand side by a concentrically supported eccentrical element axle with the carrier housing and on the other hand side rotatably connect through an eccentrically supported contact pressure axis with the contact pressure roller. Per definition an eccentrical element is a connecting component with two parallel rotation axes which does not change an inclination of the two rotation axis upon displacement but also does not impede the execution of complete revolutions about each of the two axes. Thus, the contact pressure roller itself is connected with a support that is concentric with respect to the contact pressure roller about a first rotation axis of the parallel rotation axes of the eccentrical element which causes a uniform rolling of the contact pressure roller. The eccentrical support is achieved in that the second rotation axis enters into a concentric rotatable connection with the carrier housing. By using the eccentrically supported contact pressure roller and the transport roller instead of the usual pairs of feed rollers which are pressed together by the elastic pressure according to the prior art the apparatus can be constructed from typical components in a cost effective manner.

In an advantageous embodiment a lever rod is attached at the eccentrical element wherein a weight is arranged at the lever rod in a replaceable and removable manner in order to determine a contact pressure force of the contact pressure roller. A lever arranged at the eccentrical element renders a position of the two parallel axes controllable relative to each other without directly manually operating the contact pressure roller. A force applied to the lever is transmitted directly to the freely operable axis of the contact roller which is arranged at a right angle to the lever and is thus transmitted without loss according to the leverage ratio to the transport roller arranged under the contact pressure roller. In order to change the contact pressure the previously defined weight is replaceable by a weight with higher or lower mass. The weight is useable in combination with the lever rod as a lever or handle which enables a user to additionally dynamically vary the contact pressure. When sufficient contact pressure is imparted by the weight force of the weight or manually friction between the transport roller and the material and between the material and the transport roller is sufficient to assure a uniform transportation of all components involved when moving only one of the components. This simplifies the configuration of the machine with respect to applying the required contact pressure.

In another advantageous embodiment the at least one transport roller is arranged at the carrier housing and driven by a controllable drive. The arrangement including the at least one transport roller that is driven in a controllable manner and the at least one contact pressure roller that is supported by the eccentrical element makes using plural motors for transporting the material between the rollers redundant due to a friction force between the transport roller and the material and between the material and the transport roller. Thus, the welding velocity is only controlled in an optimum manner by controlling the drive velocity of the transport roller. This arrangement operates therefore without a driven contact pressure roller which simplifies the arrangement and reduces weight.

The advantageous pivotable arrangement of the welding device at the carrier housing causes an operating position and ready position that is arranged in the pivot range of the welding device. Thus, the welding apparatus can be supported pivotable in a horizontal manner about a rotation axis advantageously perpendicular to the longitudinal extension of the carrier arm and can be essentially supported pivotable horizontally. Additionally the pivotable arrangement can be configured with a ball joint, a multi-link lever arm or through an advantageously horizontally oriented mechanical electrical linear displacement device. The operating position is characterized in that the contact roller contacts the transport roller under a force of its own weight. Furthermore the heating element of the welding apparatus in the operating position is arranged proximal to the transport roller and to the contact roller so that heating the plastic webs and an immediate compressing of the material is performed between the contact roller and the transport roller, thus sufficient to produce a durable thermoplastic connection of at least two layers of plastic webs in the welding portion in which the welding occurs. The ready position is characterized in that the contact pressure roller does not rest on the transport roller and that an unobstructed access is possible for the user for inserting or removing the plastic web into or from the table top welder since the welding device is positioned remote from the welding portion.

Moving the welding device from the operating position into the ready position and vice versa can be configured with a suitable link or another suitable movement element depending on the pivot axis. Advantageously the welding device is movable by an electric lift cylinder which engages the welding device and moves it about the rotation axis at the support arm. As a matter of principle the pivotability of the welding device can also be provided by a pneumatic lift cylinder which, however, requires an additional compressed air connection.

In another advantageous embodiment an integrated control device is provided for the welding device wherein the integrated control device causes an automatic inward pivoting and outward pivoting of the welding device at a beginning and at an end of the welding process, and/or turns off the controllable drive driving the transport roller with a delay relative to the outward pivoting of the welding device in order to prevent burning the plastic web in the portion of the weld due to the coast down thus created. In order to actuate the lift cylinder for switching the position of the welding device between the operating position and the ready position a push button or a foot pedal can be optionally used.

In an advantageous embodiment a support is arranged at the frame wherein the support is used for feeding the plastic webs to the welding arrangement in a controlled manner, wherein the welding arrangement includes the welding device in the operating position, the transport roller and the contact pressure roller. The support that is subsequently designated as material support is configured so that it facilitates various welding methods like e.g. hem welding and hollow hem welding through a simple displacement relative to the welding arrangement respectively in an optimum manner with and without an intermediary piece. Furthermore a spacer is move ably attached at the material support wherein the spacer is configured to provide that a least one edge of the plastic web is oriented towards the welding arrangement when the material support is moved. This way the width of the section of the plastic material web that is folded over relative to the welding direction is determined relative to the remaining section of the plastic material web and the different weld types are facilitated. The welding direction is predetermined by the movement direction of the material to be welded and by the sequence of material support and the welding arrangement recited supra that are passed through by the material.

Advantageously the material support is configured so that the plastic material web is inserted into an elongated opening which has is U-shaped in an intermediary portion and in order to place two sections of the material web on top of each other so that an elongated cavity is generated that is defined on one side by the coherent plastic material web and is closed on the other side by welding the edge of the plastic material web together with an edge of the plastic material web that is arranged opposite to the edge. When preforming the hem welding a width of the section of the plastic material web that is folded over perpendicular to the welding direction is selected relative to the remaining section of the plastic material web so that an elongated cavity is also formed before the welding, however, the weld seam provided after the welding process is close enough to the folded over edge so that the plastic material web does not include a cavity any more. The elongated opening in the material support is configured open at one end in order to introduce the plastic material webs. At the other end the opening is closed wherein the spacer is fixated in front of the opening so that it is movable along the opening in a linear manner.

Advantageously a rod shaped reinforcement element for insert welding can be supported by a bore hole within the U-shaped intermediary portion in the material support and can be introduced into the cavity that is generated in the plastic material web. The bore hole can be advantageously provided with a tubular support in order to provide a directionally stable insertion of the rod shaped reinforcement element in the welding direction.

In an advantageous embodiment the apparatus according to the invention includes a welding device configured as a hot air device with a hot air nozzle which is advantageously replaceable. The hot air blowers that are typically used for welding plastic material webs can be used for the hot air device wherein the hot air blowers have proven useful for this purpose. By using a hot air device instead of the typical heating wedges known in the art the apparatus can be produced in a cost effective manner with typically components. Furthermore the advantageous use of a pivotably attached hot air device facilitates manual access by the user. This facilitates advantageously replacing the hot air nozzle which provides uniform and controlled heating of the material in various configurations and on the other hand side an optimum feeding of the material to the transport and contact pressure roller through a wedge shaped structure.

The instant invention in the embodiments illustrated supra is a welding machine that handles and transports easily compared to the prior art and which can be mounted in a disengageable manner alternatively depending on the application on a table or another support structure. Due to using an eccentrically supported contact pressure roller the contact force of the contact pressure roller can be regulated using leverage and simultaneously transportation of the plastic material webs can be provided in a sufficient manner by the drive of the transport roller. Additionally the contact pressure force of the contact pressure roller is controllable any time by manual actuation of the lever rod by the operator during the welding process. Over the typical pneumatic hydraulic and electrical cylinders or spring elements that are used in the art this yields significant weight savings and an option to replace components easily which helps to use the welder in many applications in a variable and cost effective manner. Controlling the welding process can be advantageously performed by controlling temperature, air volume and speed of the transport roller by a potentiometer. Thus, the welding process is controllable in a simple manner and cost effective over the typically heating wedges due to the use of a hot air blower. The configuration of the material support and of all adjacent components facilitates simple switching between the weld types (seam, hollow seam and intermediary element) without requiring any replacement of components. The configuration also facilitates a complete dismounting and a switching of the components for adapting the support to additional material configurations.

BRIEF DESCRIPTION OF THE DRAWINGS

The invention is subsequently described based on an embodiment with reference to drawing figures. Additional features of the invention can be derived from the subsequent description of the embodiment of the invention in combination with the claims and the appended drawing figure. The individual features of the invention can be implemented individually or in combination of various embodiments of the portable welder according to the invention, wherein:

DETAILED DESCRIPTION OF THE INVENTION

Figure 1:
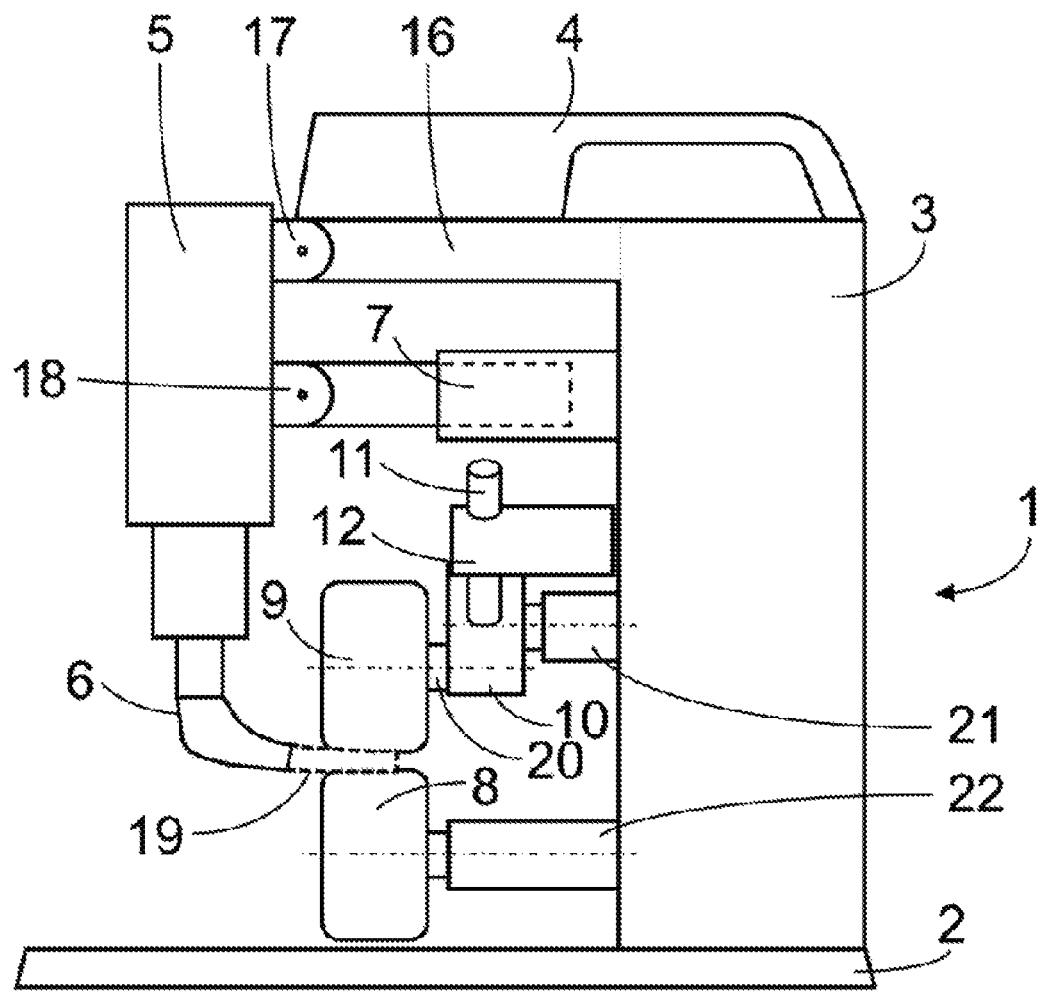
FIG. 1 illustrates a schematic view of a basic configuration of the welder without material support in the operating position.

The portable welder illustrated in FIG. 1 for welding plastic material webs is arranged on a frame 1 which includes a base plate 2, a carrier housing 3 and a support arm 16. The base plate 2 can include a device that is not illustrated in the drawing figure and which facilitates to optionally attach the apparatus for example on a table or a stand base, for example with threaded clamps or similar attachment devices. The carrier frame 4 arranged at the carrier housing 3 is used for simple transportation and optional positioning on carrier structures. A welding device 5 configured as a hot air device that is pivotable and replaceable is arranged at the support arm 16 wherein a position of the welding device is adjustable in a controlled manner within the arrangement by an electrical lift cylinder 7 which engages a pivot support 18 also at the welding device 5. For actuating the lift cylinder 7 for switching a position of the welding device 5 between the operating position (FIG. 1) and the ready position (FIG. 2) a non-illustrated push button or a foot pedal (not illustrated) are being used. The heater 5 includes a replaceable hot air nozzle 6 with an air permeable perforation 19 in order to provide uniform heating of the plastic material webs when performing different welding methods, like hem welding or hollow hem welding respectively with or without intermediary piece and to feed the plastic material webs in an optimum manner to the contact portion between a transport roller 8 and a contact pressure roller 9 after heating. The transport roller 8 is rotatably connected with the carrier housing 3 by a contact pressure roller axle 22 and the contact pressure roller is operated by a controllable drive. Thus, the transport roller 8 is used primarily for transporting the material to be welded along the weld seam. Furthermore a contact pressure roller 9 contacting the transport roller fixates the position of the plastic material webs 24 (FIG. 3) within the welding machine and the layers of the plastic material webs 24 that are arranged on top of each other are simultaneously pressed together for a short time period which suffices for producing a permanent thermoplastic connection. The contact pressure roller 9 itself is rotatably and eccentrically arranged at an eccentrical element 10 through a concentrically arranged contact pressure roller axle 20 wherein the eccentrical element 10 is rotate ably attached at the carrier housing 3 through a concentrically arranged eccentrical element axis 21. This facilitates adjusting a position of the contact pressure roller 9 with reference to a position of the transport roller 8 so that the plastic material webs are inserted or removed before or after welding between the contact pressure roller 9 and the transport roller 8. The required contact pressure of the contact pressure roller 9 on the transport roller 8 is regulated in that a lever rod 11 is arranged at the an eccentrical element 10, wherein a weight 12 is attached in a disengage able manner at the lever rod 11 wherein the weight is moveably arranged along the longitudinal axis of the lever rod 11.

Figure 2:
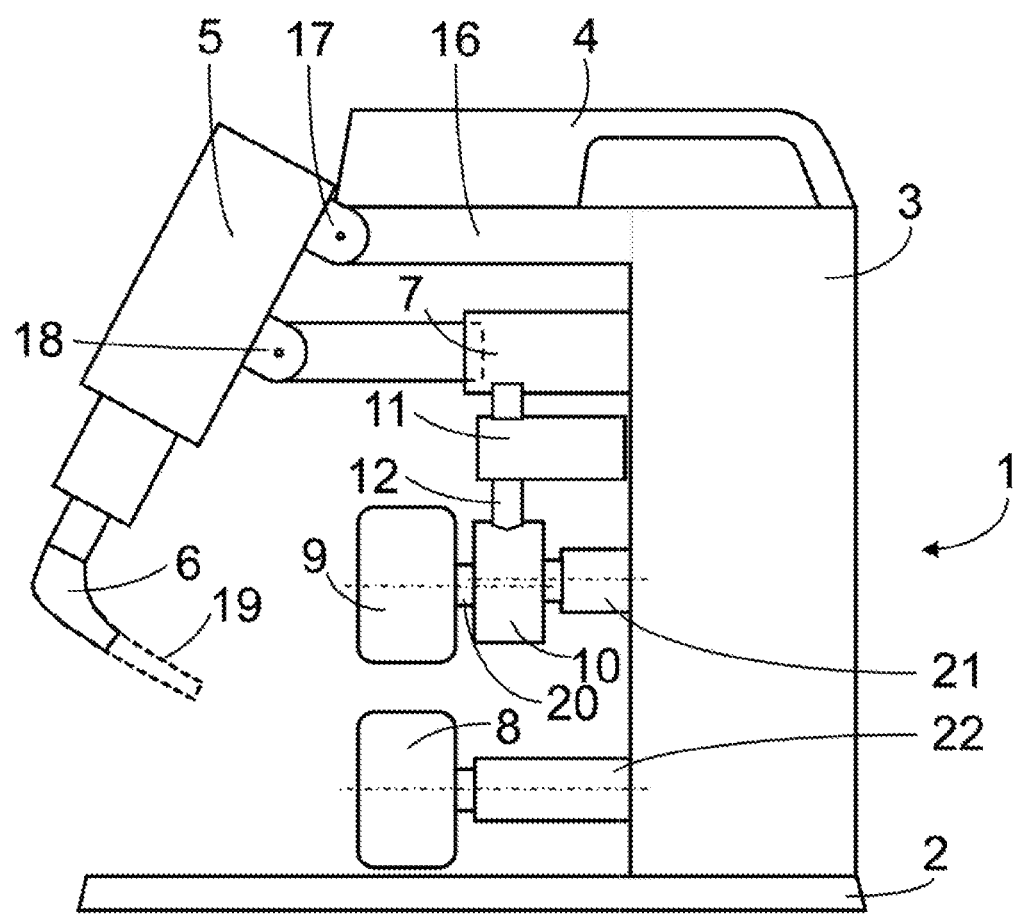
FIG. 2 illustrates a schematic view of a basic configuration of the welder without material support in the ready position.

In analogy to the representation of the welding machine in the operating position in FIG. 1, FIG. 2 illustrates the arrangement of the same components in the ready position. The hot air device 5 is moved into a position by deploying the electrical lift cylinder 7 wherein the position facilitates access to the hot air nozzle 6 and replacing the hot air nozzle 6. The component group including the contact pressure roller 9, the eccentrical element 10, the lever rod 11 and the weight 12 is rotated about the eccentrical element axis 21 between the eccentrical element 10 and the frame 1 so that the contact pressure roller 9 does not contact the transport roller 8. This ready position facilitates unimpeded access of the user for inserting or removing plastic material webs into the machine or from the machine.

Figure 3:
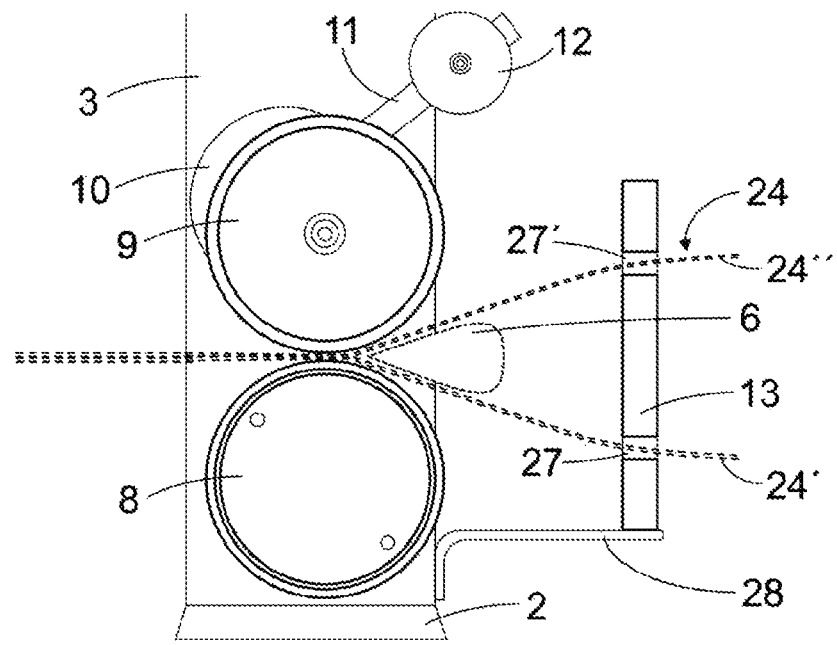
FIG. 3 illustrates a schematic side view of the welder, in particular of the transport roller, the contact pressure roller and the basic configuration of the material support and of the indicated position of a hot air nozzle.

The path of the material web 24 inserted into the machine is illustrated in FIG. 3 with the long dashed lines. FIG. 3 additionally illustrates a hot air nozzle 6 at a location that is pivoted in during the welding process. The welding device according to the definition provided supra extends in this side view from right to left, thus the plastic material web 24 is run in this embodiment in the component sequence initially through a material support 13 attached at a carrier 28 at the carrier housing 3, wherein the two indicated recesses 27, 27' transition in the material support 13 into a U-shaped intermediary portion 26 (FIG. 4) whose apex point is arranged in FIG. 3 behind the image plane but between the recesses 27, 27'.

The wider portion 24' of the plastic material web 24 is thus arranged in the lower recess 27 and the folded over narrow portion 24" of the plastic material web 24 is thus arranged in the upper recess 27'. The lower recess 27 is thus open in this embodiment in front of the image plane in order to provide a pass through of the plastic material web 24. The upper recess 27' is closed in this embodiment in front of the image plane in order to prevent a sliding of the plastic material web 24 and to obtain the same width of the folded over portion 24" for all sections of the fold over hem or hollow hem to be welded. In the component sequence the plastic material web 24 is subsequently run about the hot air nozzle 6. In the portion of the hot air nozzle 6 both layers 24" of the plastic material web 24 are heated sufficiently to enter a thermoplastic connection. The heated layers 24', 24" of the plastic material web 24 are then run in parallel between the driven transport roller 8 and the contact roller 9.

Figure 4:
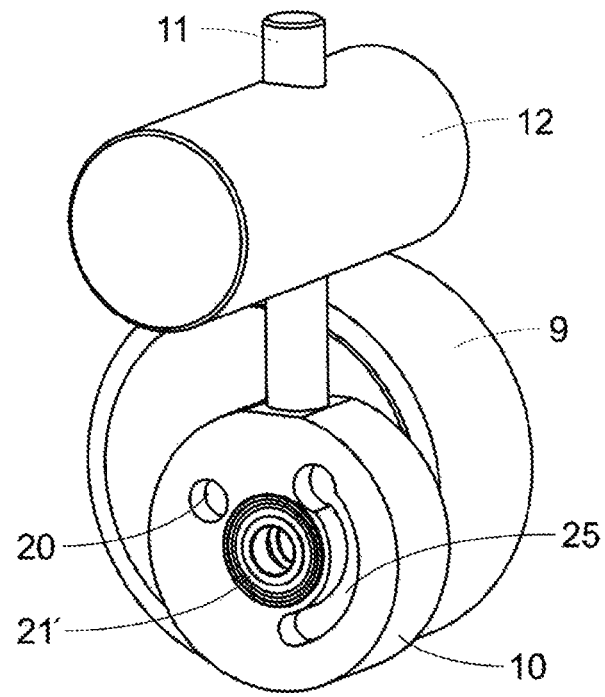
FIG. 4 illustrates a detail view of the eccentrical element for supporting the contact roller including a weight and a lever rod.

FIG. 4 illustrates the sub assembly including the lever rod 11, the weight 12 and the eccentrical element 10. In this embodiment the weight 12 is movably fixated along the longitudinal axis of the lever rod 11, wherein the lever rod 11 can be connected in a disengageable manner through a thread with the eccentrical element 10. The position of the contact pressure roller 9 is indicated in this illustration through the contact pressure roller axis 20 at the eccentrical element 10 and is thus arranged in this embodiment on a right side behind the eccentrical element 10. The centric opening 21' of the eccentrical element 10 facilitates receiving the non-illustrated eccentrical element axle 21 which rotatably connects the eccentrical element 10 with the carrier housing 3. In this embodiment a groove 25 configured as a circle segment is milled along the central opening 21 wherein the groove together with a pin that is attached at the carrier housing 3 and not illustrated limits the rotation angle of the eccentrical element 10 to an angle range that is limited by the circle segment.

Figure 5:
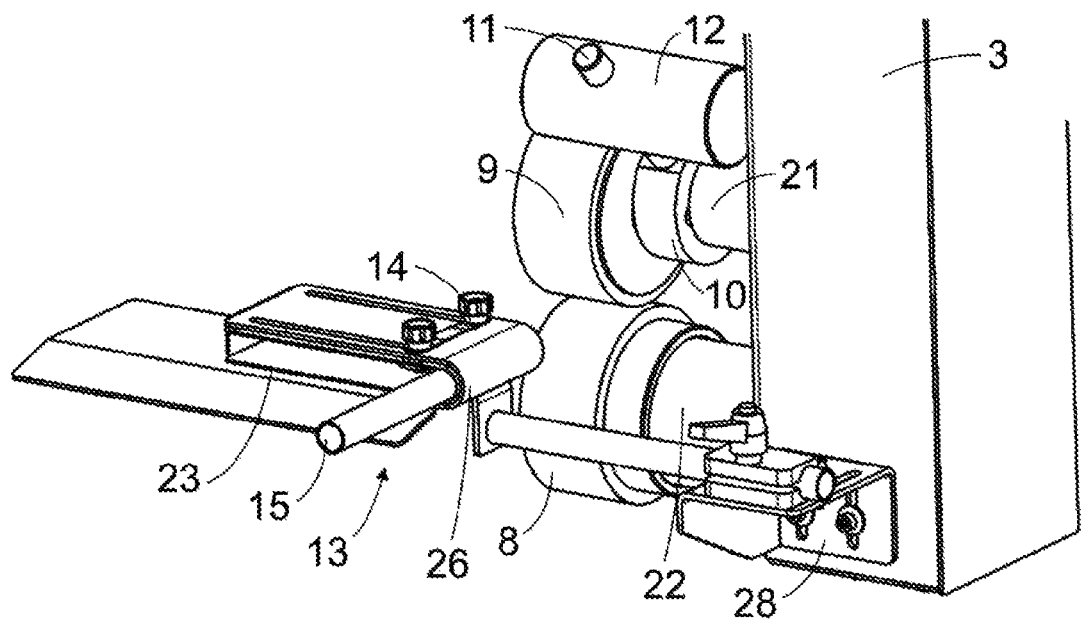
FIG. 5 illustrates a detail view of the material support in the configuration for hem welding, optionally with or without intermediary element.
Figure 6:
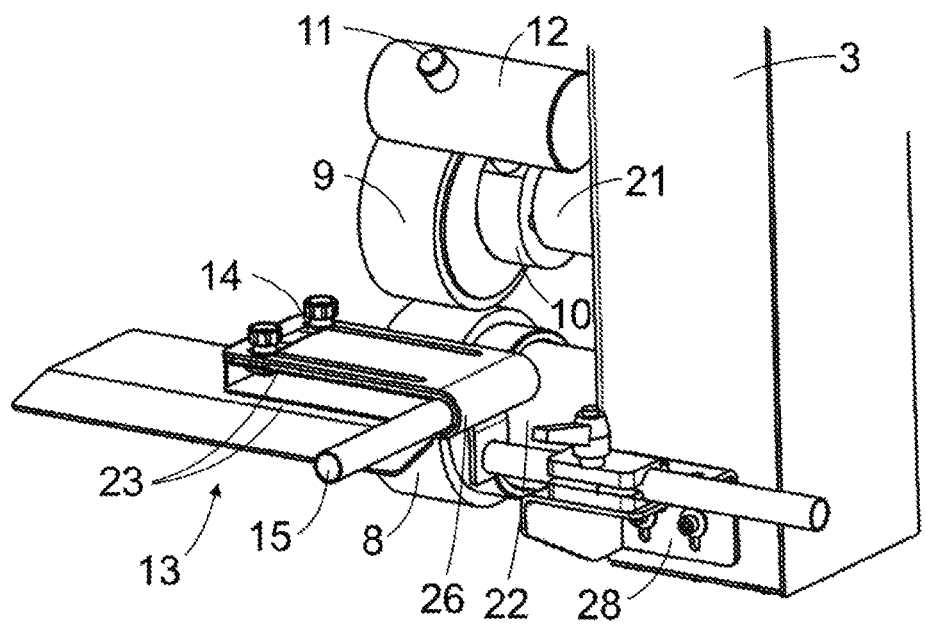
FIG. 6 illustrates a detail view of the material support in the configuration for hollow hem welding, optionally with or without the intermediary element.

FIGS. 5 and 6 illustrate the shape of the material support 13 used in this embodiment in basic positions for hem welding (FIG. 5) and hollow hem welding (FIG. 6). Thus, the material support 13 is connected in a disengageable manner with the carrier housing 6 through the carrier 28 wherein the carrier 28 facilitates a displacement of the material support 13 perpendicular to the welding direction but parallel to a plane defined by the plastic material web 24 inserted into the material support 13 through the opening 23. The welding direction according to the definition provided supra extends in this view from a left front side to a right back side with reference to the image plane. When the material support 13 is moved to the left looking in the welding direction (FIG. 5), then the U-shaped intermediary portion 26 of the opening 23 at the material support 13 is closer to the welding portion predetermined by the welding arrangement, than for a movement of the material support 13 viewed in the welding direction to the right (FIG. 6). Thus, for a plastic material web 24 that is supported by the opening 23 in the material support 13 and not illustrated herein the width of the elongated cavity is determined which is defined on the one side by the continuous plastic material web 24 and on the other side by the welding of the narrow portion 24" of the plastic material web 24 to the wide opposite portion 24' of the plastic material web 24 which is closed. The spacer 14 that is movably and disengageably fixated at the material support 13 determines the width of the narrow portion 24" of the plastic material web 24 that is folded perpendicular to the welding direction relative to the remaining 24' of the plastic material web 24 and assures in this embodiment an adjustment of the distance between the face edge of the narrow plastic material web 24" that is folded in the material support 13 and the parallel extending (not illustrated) weld seam. FIGS. 5 and 6 illustrate a tubular support within the U-shaped intermediary portion 23 in the material support 13 in this embodiment instead of an opening which optimizes a support a rod shaped reinforcement piece for intermediary element welding in the cavity of the plastic material web 24.

What is claimed is:

1. A portable table top welder for welding plastic material webs, the portable table top welder comprising:
   a frame including a carrier housing including a carry handle and a support arm on which a welding device including a hot air nozzle is arranged;
   at least one transport roller including a rotatable transport roller axle and at least one contact pressure roller that is rotatably supported at the carrier housing,
   wherein the at least one transport roller and the at least one contact pressure roller are arranged downstream of the hot air nozzle and in direct contact with the plastic material webs during the welding,
   wherein the at least one contact pressure roller is arranged above the at least one transport roller,
   wherein the at least one transport roller is arranged on the carrier housing and driven by a controllable or regulatable drive,
   wherein the at least one contact pressure roller is not driven,
   wherein a weight is connected to an eccentrical element,
   wherein the eccentrical element is rotatably connected to the carrier housing at one side by a concentrically supported eccentrical element axle and the eccentrical element is rotatably connected on another side to the at least one contact pressure roller by an eccentrically supported contact pressure roller axle,
   wherein the welding device is pivotably arranged on the carrier housing so that the welding device is pivotable in a plane that is substantially parallel to a plane that is defined by the transport roller axle and the contact pressure roller axle in an operating position of the welding device,
   wherein the welding device is pivotable from a ready position where the welding device is not in contact with the plastic material webs to the operating position where the welding device is in contact with the plastic material webs,
   wherein the at least one contact pressure roller is caused by the weight to pivot about the eccentrical element axle in a first direction of rotation together with the weight,
   wherein the at least one contact pressure roller rotates about contact pressure roller axle in a second direction of rotation when the plastic material webs are welded by the portable table top welder,
   wherein the first direction of rotation is identical to the second direction of rotation,
   wherein the weight is arranged above the hot air nozzle, and
   wherein the weight moves downward towards the hot air nozzle when the the at least one contact pressure roller is caused by the weight to pivot about the eccentrical element axle in the first direction of rotation towards the at least one transport roller.

2. The portable table top welder according to claim 1, wherein a lever rod is attached on the eccentrical element, and
   wherein the weight is arranged at the lever rod in a replaceable and slideable manner so that the weight determines a contact pressure force of the contact pressure roller.

3. The portable table top welder according to claim 1, wherein the welding device is movable by at least one electrical lift cylinder between the operating position and the ready position.

4. The portable table top welder according to claim 1, further comprising a control device which causes an automatic inward pivoting and outward pivoting of the welding device at a beginning and at an end of a welding process and which turns off the controllable drive that drives the at least one transport roller, wherein the drive is turned off with a delay relative to the outward pivoting of the welding device.

5. The portable table top welder according to claim 1, further comprising a material support that is adjustable and movable horizontally perpendicular to a welding direction and which includes a spacer that is movably attached at the material support.

6. The portable table top welder according to claim 5, wherein the material support includes an opening with a U-shaped portion into which an edge of the plastic material webs are insertable so that the plastic material webs are folded before welding, and wherein the plastic material webs are closed on one side by the welding.

7. The portable table top welder according to claim 6, further comprising a bore hole that is open in the welding direction in a portion of the material support, wherein the borehole is configured to facilitate an insertion of a rod shaped reinforcement element into a cavity formed by the plastic material web that is run through the opening with the U-shaped portion.

8. The portable table top welder according to claim 1, wherein the welding device is configured as a hot air device which includes the hot air nozzle which is replaceable.

* * * * *